US012755108B2

(12) United States Patent
Göral

(10) Patent No.: US 12,755,108 B2
(45) Date of Patent: Oct. 6, 2026

(54) DETECTING AND SELECTIVELY BUFFERING MARKUP INSTRUCTION CANDIDATES IN A STREAMED LANGUAGE MODEL OUTPUT

(71) Applicant: Shopify Inc., Ottawa (CA)

(72) Inventor: Ateş Göral, Toronto (CA)

(73) Assignee: Shopify Inc., Ottawa (CA)

( * ) Notice: Subject to any disclaimer, the term of this patent is extended or adjusted under 35 U.S.C. 154(b) by 188 days.

(21) Appl. No.: 18/591,337

(22) Filed: Feb. 29, 2024

(65) Prior Publication Data

US 2025/0232135 A1 Jul. 17, 2025

Related U.S. Application Data

(60) Provisional application No. 63/621,612, filed on Jan. 17, 2024.

(51) Int. Cl.

*G06F 40/40* (2020.01)
*G06F 40/205* (2020.01)
*G06F 40/284* (2020.01)

(52) U.S. Cl.

CPC ............ *G06F 40/40* (2020.01); *G06F 40/205* (2020.01); *G06F 40/284* (2020.01)

(58) Field of Classification Search

CPC ....... G06F 40/40; G06F 40/205; G06F 40/284

See application file for complete search history.

(56) References Cited

U.S. PATENT DOCUMENTS

| | | | | |
|---|---|---|---|---|
| 6,785,708 | B1 * | 8/2004 | Busey | G06Q 30/02 709/227 |
| 7,240,283 | B1 * | 7/2007 | Paila | G06F 40/143 705/26.4 |
| 7,836,395 | B1 * | 11/2010 | Francis | G06F 16/258 715/239 |
| 9,190,056 | B2 * | 11/2015 | Zhu | G10L 15/22 |
| 11,042,692 | B1 * | 6/2021 | Greisen | G06F 40/14 |

(Continued)

OTHER PUBLICATIONS

Goral, A. et al., "Sidekick's Improved Streaming Experience," Shopify Engineering, Aug. 1, 2023, available from the Internet: [URL: https://shopify.engineering/sidekicks-improved-streaming], 15 pages.

*Primary Examiner* — Athar N Pasha

(74) *Attorney, Agent, or Firm* — Withrow & Terranova, PLLC

(57) ABSTRACT

Systems and methods for detecting and selectively buffering markup instruction candidates in a streamed language model output are provided. In some embodiments, a computer-implemented method includes receiving a stream of symbols from a language model; and streaming the received stream of symbols as output. The output is caused to be rendered on a display. The streaming the symbols as output include detecting a markup sequence in the received stream of symbols. In response to detecting the markup sequence, the method pauses the streaming of the symbols as output and instead streams the received stream of symbols to a buffer. The method also includes detecting a further markup sequence in the received stream of symbols. In responsive to detecting the further markup sequence in the received stream of symbols, the method causes the symbols in the buffer to be rendered and resumes streaming the received stream of symbols as output.

21 Claims, 6 Drawing Sheets

(56) References Cited

U.S. PATENT DOCUMENTS

| | | | | |
|---|---|---|---|---|
| 2001/0052910 | A1* | 12/2001 | Parekh | G07F 17/3211 715/744 |
| 2002/0052899 | A1* | 5/2002 | Fujikawa | G06F 40/174 715/255 |
| 2003/0046533 | A1* | 3/2003 | Olkin | H04L 63/08 713/152 |
| 2003/0074552 | A1* | 4/2003 | Olkin | H04L 63/062 713/150 |
| 2003/0154292 | A1* | 8/2003 | Spriestersbach | G06F 3/04886 709/228 |
| 2004/0006744 | A1* | 1/2004 | Jones | G06F 40/143 715/237 |
| 2004/0119684 | A1* | 6/2004 | Back | G06F 1/1694 345/156 |
| 2010/0235910 | A1* | 9/2010 | Ku | G06F 16/958 726/22 |
| 2011/0119573 | A1* | 5/2011 | Rudolph | G06F 40/106 715/256 |
| 2011/0197125 | A1* | 8/2011 | Sun | G06F 16/9574 715/234 |
| 2011/0239294 | A1* | 9/2011 | Kim | G06F 21/563 726/22 |
| 2012/0102389 | A1* | 4/2012 | Gattani | G06F 16/9577 715/234 |
| 2012/0232904 | A1* | 9/2012 | Zhu | G10L 15/22 704/E15.005 |
| 2015/0012809 | A1* | 1/2015 | Kaushik | G06F 8/51 715/234 |
| 2015/0106928 | A1* | 4/2015 | Steinmann | H04L 63/145 709/206 |
| 2016/0034178 | A1* | 2/2016 | Yoon | G06F 40/143 715/773 |
| 2016/0055126 | A1* | 2/2016 | Doerr | G06F 8/38 715/745 |
| 2019/0042549 | A1* | 2/2019 | Lu | G06F 9/451 |
| 2019/0303136 | A1* | 10/2019 | Chen | G06F 9/454 |
| 2024/0333779 | A1* | 10/2024 | Springer | H04L 65/1094 |
| 2025/0131185 | A1* | 4/2025 | Jain | G06Q 10/0633 |

* cited by examiner

DETECTING AND SELECTIVELY BUFFERING MARKUP INSTRUCTION CANDIDATES IN A STREAMED LANGUAGE MODEL OUTPUT

TECHNICAL FIELD

The present disclosure relates to streamed language model output.

BACKGROUND

Language models use statistical and/or probabilistic mechanisms to determine the probability of a given sequence of words occurring in a sentence. The language models can be used to answer questions or to synthesize new content based on queries. There is a need for techniques to improve the streamed language model output.

SUMMARY

Systems and methods for detecting and selectively buffering markup instruction candidates in a streamed language model output are provided. In some embodiments, a computer-implemented method includes receiving a stream of symbols from a language model; and streaming the received stream of symbols as output. The output is caused to be rendered on a display. Streaming the symbols as output includes detecting a markup sequence in the received stream of symbols. In response to detecting the markup sequence, the method pauses the streaming of the symbols as output and instead streams the received stream of symbols to a buffer. The method also includes detecting a further markup sequence in the received stream of symbols. In response to detecting the further markup sequence in the received stream of symbols, the method causes the symbols in the buffer to be rendered and resumes streaming the received stream of symbols as output.

In one embodiment, the markup sequence and further markup sequence denote a markup instruction. In one embodiment, responsive to the denoted markup instruction, the symbols in the buffer are caused to be rendered based on the markup instruction.

In one embodiment, the markup sequence and further markup sequence denote a false detection of a markup instruction. In one embodiment, responsive to the false detection of the markup instruction, the symbols in the buffer are caused to be rendered without the markup instruction.

In one embodiment, the language model is a Large Language Model (LLM). In one embodiment, the markup instruction is from a Markdown markup language. In one embodiment, the markup instruction is from a markup language comprising one of the group consisting of: HTML; XML; and Chat Markup Language.

In one embodiment, the method also includes, before detecting the further markup sequence, causing to be rendered on a display that buffering is occurring.

In one embodiment, receiving the stream and streaming the received stream of symbols are implemented through the use of a stateful stream processor coupled with a buffer. In one embodiment, the received stream of symbols is parsed by the stateful stream processor which updates a buffer based on whether the sequence in the received stream of symbols currently being parsed is a candidate for a markup instruction.

Corresponding embodiments of a computing system operable to perform the aforementioned method are also disclosed.

BRIEF DESCRIPTION OF THE DRAWINGS

Reference will now be made, by way of example, to the accompanying drawings which show example embodiments of the present application, and in which.

Like reference numerals are used in the drawings to denote like elements and features.

DETAILED DESCRIPTION OF EMBODIMENTS

Figure 1A:
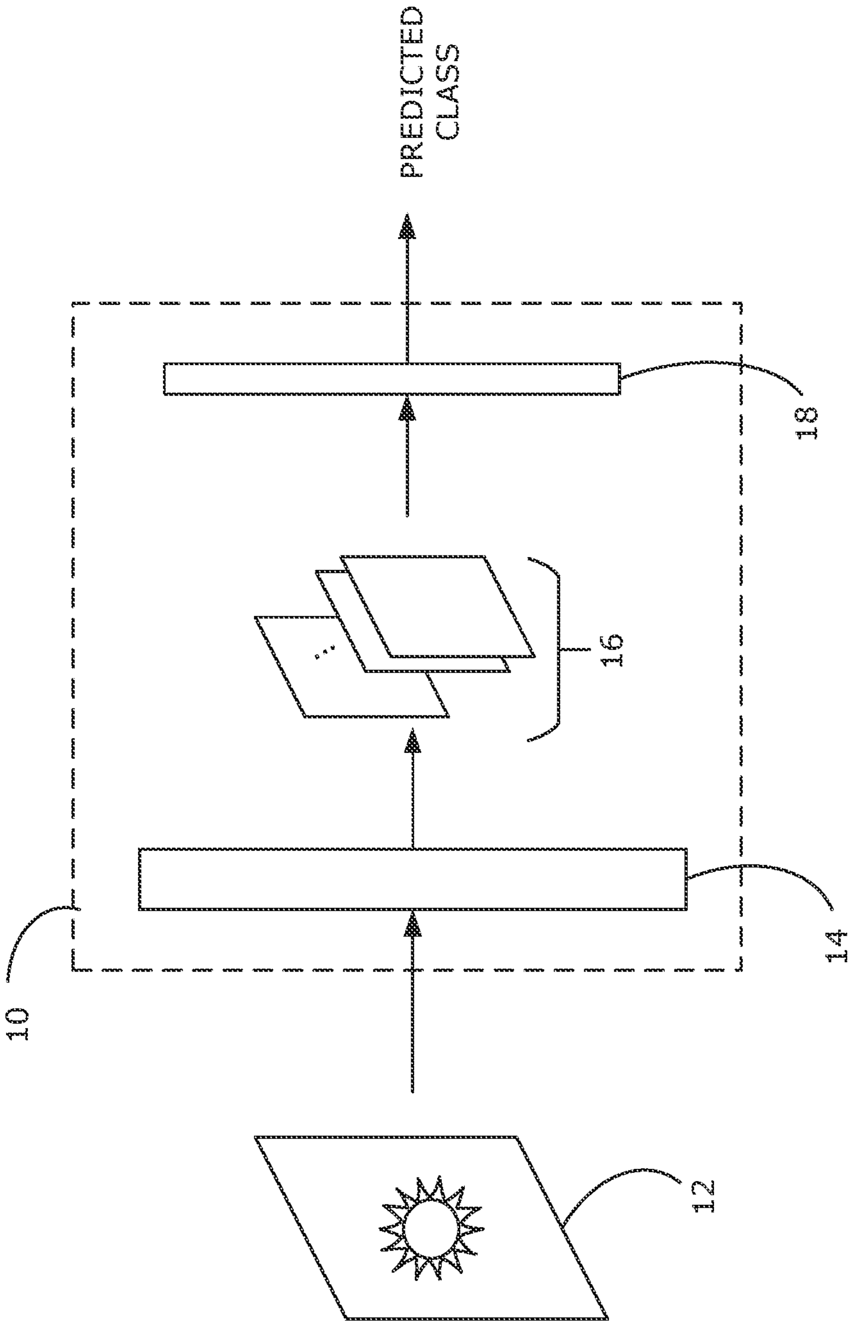
FIG. 1A is a block diagram of a simplified convolutional neural network, which may be used in examples of the present disclosure.

To assist in understanding the present disclosure, some concepts relevant to neural networks and machine learning (ML) are first discussed.

Generally, a neural network comprises a number of computation units (sometimes referred to as "neurons"). Each neuron receives an input value and applies a function to the input to generate an output value. The function typically includes a parameter (also referred to as a "weight") whose value is learned through the process of training. A plurality of neurons may be organized into a neural network layer (or simply "layer") and there may be multiple such layers in a neural network. The output of one layer may be provided as input to a subsequent layer. Thus, input to a neural network may be processed through a succession of layers until an output of the neural network is generated by a final layer. This is a simplistic discussion of neural networks and there may be more complex neural network designs that include feedback connections, skip connections, and/or other such possible connections between neurons and/or layers, which need not be discussed in detail here.

A deep neural network (DNN) is a type of neural network having multiple layers and/or a large number of neurons. The term DNN may encompass any neural network having multiple layers, including convolutional neural networks (CNNs), recurrent neural networks (RNNs), and multilayer perceptrons (MLPs), among others.

DNNs are often used as ML-based models for modeling complex behaviors (e.g., human language, image recognition, object classification, etc.) in order to improve accuracy of outputs (e.g., more accurate predictions) such as, for example, as compared with models with fewer layers. In the present disclosure, the term "ML-based model" or more simply "ML model" may be understood to refer to a DNN. Training a ML model refers to a process of learning the values of the parameters (or weights) of the neurons in the layers such that the ML model is able to model the target behavior to a desired degree of accuracy. Training typically requires the use of a training dataset, which is a set of data that is relevant to the target behavior of the ML model. For example, to train a ML model that is intended to model human language (also referred to as a language model), the training dataset may be a collection of text documents, referred to as a text corpus (or simply referred to as a corpus). The corpus may represent a language domain (e.g., a single language), a subject domain (e.g., scientific papers), and/or may encompass another domain or domains, be they larger or smaller than a single language or subject domain. For example, a relatively large, multilingual and non-subject-specific corpus may be created by extracting text from online webpages and/or publicly available social media posts. In another example, to train a ML model that is intended to classify images, the training dataset may be a collection of images. Training data may be annotated with ground truth labels (e.g., each data entry in the training dataset may be paired with a label) or may be unlabeled.

Training a ML model generally involves inputting into an ML model (e.g., an untrained ML model) training data to be processed by the ML model, processing the training data using the ML model, collecting the output generated by the ML model (e.g., based on the inputted training data), and comparing the output to a desired set of target values. If the training data is labeled, the desired target values may be, e.g., the ground truth labels of the training data. If the training data is unlabeled, the desired target value may be a reconstructed (or otherwise processed) version of the corresponding ML model input (e.g., in the case of an autoencoder), or may be a measure of some target observable effect on the environment (e.g., in the case of a reinforcement learning agent). The parameters of the ML model are updated based on a difference between the generated output value and the desired target value. For example, if the value outputted by the ML model is excessively high, the parameters may be adjusted so as to lower the output value in future training iterations. An objective function is a way to quantitatively represent how close the output value is to the target value. An objective function represents a quantity (or one or more quantities) to be optimized (e.g., minimize a loss or maximize a reward) in order to bring the output value as close to the target value as possible. The goal of training the ML model typically is to minimize a loss function or maximize a reward function.

The training data may be a subset of a larger data set. For example, a data set may be split into three mutually exclusive subsets: a training set, a validation (or cross-validation) set, and a testing set. The three subsets of data may be used sequentially during ML model training. For example, the training set may be first used to train one or more ML models, each ML model, e.g., having a particular architecture, having a particular training procedure, being describable by a set of model hyperparameters, and/or otherwise being varied from the other of the one or more ML models. The validation (or cross-validation) set may then be used as input data into the trained ML models to, e.g., measure the performance of the trained ML models and/or compare performance between them. Where hyperparameters are used, a new set of hyperparameters may be determined based on the measured performance of one or more of the trained ML models, and the first step of training (i.e., with the training set) may begin again on a different ML model described by the new set of determined hyperparameters. In this way, these steps may be repeated to produce a more performant trained ML model. Once such a trained ML model is obtained (e.g., after the hyperparameters have been adjusted to achieve a desired level of performance), a third step of collecting the output generated by the trained ML model applied to the third subset (the testing set) may begin. The output generated from the testing set may be compared with the corresponding desired target values to give a final assessment of the trained ML model's accuracy. Other segmentations of the larger data set and/or schemes for using the segments for training one or more ML models are possible.

Backpropagation is an algorithm for training a ML model. Backpropagation is used to adjust (also referred to as update) the value of the parameters in the ML model, with the goal of optimizing the objective function. For example, a defined loss function is calculated by forward propagation of an input to obtain an output of the ML model and comparison of the output value with the target value. Backpropagation calculates a gradient of the loss function with respect to the parameters of the ML model, and a gradient algorithm (e.g., gradient descent) is used to update (i.e., "learn") the parameters to reduce the loss function. Backpropagation is performed iteratively, so that the loss function is converged or minimized. Other techniques for learning the parameters of the ML model may be used. The process of updating (or learning) the parameters over many iterations is referred to as training. Training may be carried out iteratively until a convergence condition is met (e.g., a predefined maximum number of iterations has been performed, or the value outputted by the ML model is sufficiently converged with the desired target value), after which the ML model is considered to be sufficiently trained. The values of the learned parameters may then be fixed, and the ML model may be deployed to generate output in real-world applications (also referred to as "inference").

In some examples, a trained ML model may be fine-tuned, meaning that the values of the learned parameters may be adjusted slightly in order for the ML model to better model a specific task. Fine-tuning of a ML model typically involves further training the ML model on a number of data samples (which may be smaller in number/cardinality than those used to train the model initially) that closely target the specific task. For example, a ML model for generating natural language that has been trained generically on publicly-available text corpuses may be, e.g., fine-tuned by further training using the complete works of Shakespeare as training data samples (e.g., where the intended use of the ML model is generating a scene of a play or other textual content in the style of Shakespeare).

FIG. 1A is a simplified diagram of an example CNN 10, which is an example of a DNN that is commonly used for image processing tasks such as image classification, image analysis, object segmentation, etc. An input to the CNN 10 may be a 2D RGB image 12.

The CNN 10 includes a plurality of layers that process the image 12 in order to generate an output, such as a predicted classification or predicted label for the image 12. For simplicity, only a few layers of the CNN 10 are illustrated including at least one convolutional layer 14. The convolutional layer 14 performs convolution processing, which may involve computing a dot product between the input to the convolutional layer 14 and a convolution kernel. A convolutional kernel is typically a 2D matrix of learned parameters that is applied to the input in order to extract image features. Different convolutional kernels may be applied to extract different image information, such as shape information, color information, etc.

The output of the convolution layer 14 is a set of feature maps 16 (sometimes referred to as activation maps). Each feature map 16 generally has smaller width and height than the image 12. The set of feature maps 16 encode image features that may be processed by subsequent layers of the CNN 10, depending on the design and intended task for the CNN 10. In this example, a fully connected layer 18 processes the set of feature maps 16 in order to perform a classification of the image, based on the features encoded in the set of feature maps 16. The fully connected layer 18 contains learned parameters that, when applied to the set of feature maps 16, outputs a set of probabilities representing the likelihood that the image 12 belongs to each of a defined set of possible classes. The class having the highest probability may then be outputted as the predicted classification for the image 12.

In general, a CNN may have different numbers and different types of layers, such as multiple convolution layers, max-pooling layers and/or a fully connected layer, among others. The parameters of the CNN may be learned through training, using data having ground truth labels specific to the desired task (e.g., class labels if the CNN is being trained for a classification task, pixel masks if the CNN is being trained for a segmentation task, text annotations if the CNN is being trained for a captioning task, etc.), as discussed above.

Some concepts in ML-based language models are now discussed. It may be noted that, while the term "language model" has been commonly used to refer to a ML-based language model, there could exist non-ML language models. In the present disclosure, the term "language model" may be used as shorthand for ML-based language model (i.e., a language model that is implemented using a neural network or other ML architecture), unless stated otherwise. For example, unless stated otherwise, "language model" encompasses LLMs.

A language model may use a neural network (typically a DNN) to perform natural language processing (NLP) tasks such as language translation, image captioning, grammatical error correction, and language generation, among others. A language model may be trained to model how words relate to each other in a textual sequence, based on probabilities. A language model may contain hundreds of thousands of learned parameters or in the case of a large language model (LLM) may contain millions or billions of learned parameters or more.

In recent years, there has been interest in a type of neural network architecture, referred to as a transformer, for use as language models. For example, the Bidirectional Encoder Representations from Transformers (BERT) model, the Transformer-XL model and the Generative Pre-trained Transformer (GPT) models are types of transformers. A transformer is a type of neural network architecture that uses self-attention mechanisms in order to generate predicted output based on input data that has some sequential meaning (i.e., the order of the input data is meaningful, which is the case for most text input). Although transformer-based language models are described herein, it should be understood that the present disclosure may be applicable to any ML-based language model, including language models based on other neural network architectures such as recurrent neural network (RNN)-based language models.

Figure 1B:
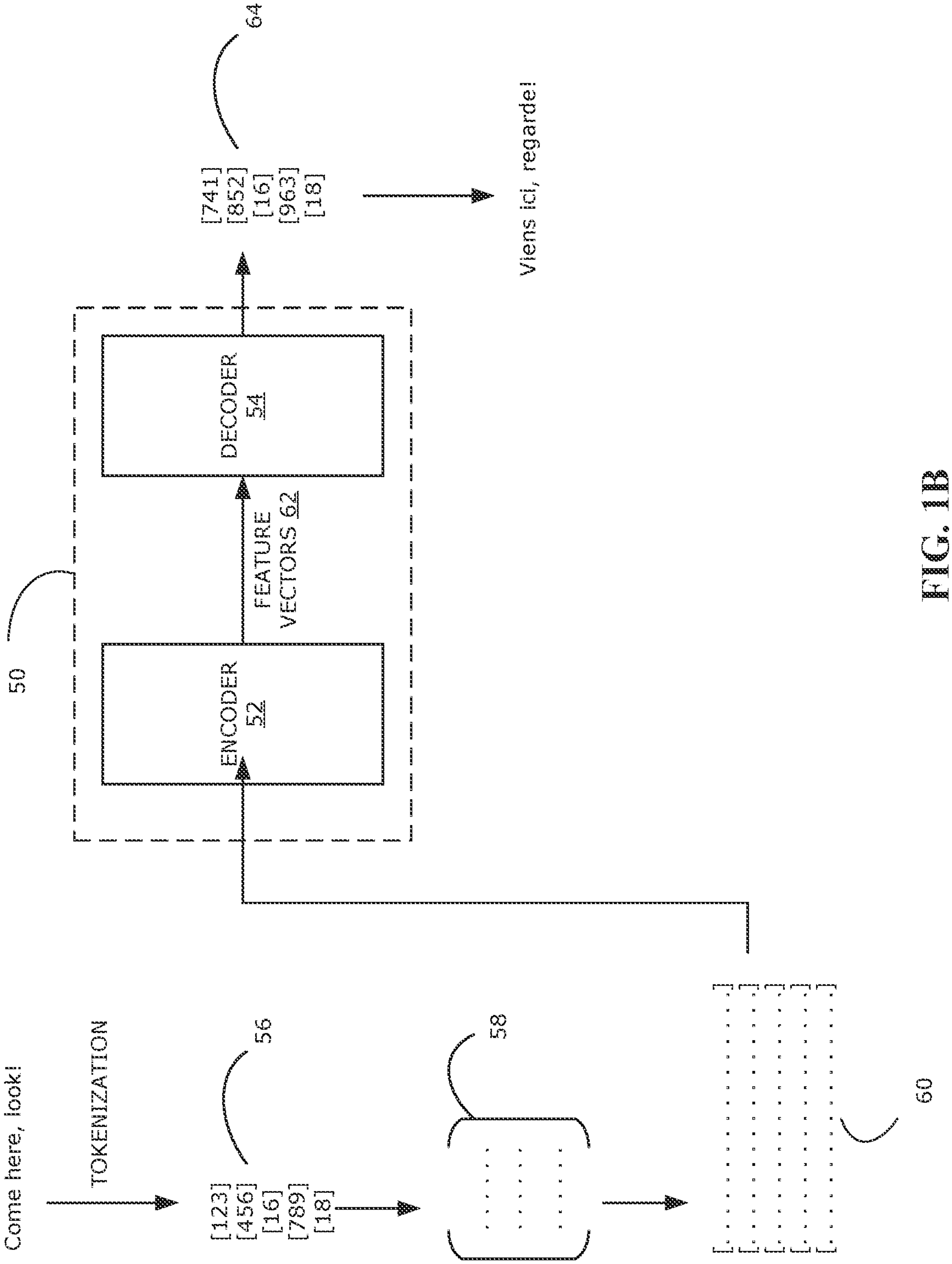
FIG. 1B is a block diagram of a simplified transformer neural network, which may be used in examples of the present disclosure.

FIG. 1B is a simplified diagram of an example transformer 50, and a simplified discussion of its operation is now provided. The transformer 50 includes an encoder 52 (which may comprise one or more encoder layers/blocks connected in series) and a decoder 54 (which may comprise one or more decoder layers/blocks connected in series). Generally, the encoder 52 and the decoder 54 each include a plurality of neural network layers, at least one of which may be a self-attention layer. The parameters of the neural network layers may be referred to as the parameters of the language model.

The transformer 50 may be trained on a text corpus that is labelled (e.g., annotated to indicate verbs, nouns, etc.) or unlabelled. LLMs may be trained on a large unlabelled corpus. Some LLMs may be trained on a large multi-language, multi-domain corpus, to enable the model to be versatile at a variety of language-based tasks such as generative tasks (e.g., generating human-like natural language responses to natural language input).

An example of how the transformer 50 may process textual input data is now described. Input to a language model (whether transformer-based or otherwise) typically is in the form of natural language as may be parsed into tokens. It should be appreciated that the term "token" in the context of language models and NLP has a different meaning from the use of the same term in other contexts such as data security. Tokenization, in the context of language models and NLP, refers to the process of parsing textual input (e.g., a character, a word, a phrase, a sentence, a paragraph, etc.) into a sequence of shorter segments that are converted to numerical representations referred to as tokens (or "compute tokens"). Typically, a token may be an integer that corresponds to the index of a text segment (e.g., a word) in a vocabulary dataset. Often, the vocabulary dataset is arranged by frequency of use. Commonly occurring text, such as punctuation, may have a lower vocabulary index in the dataset and thus be represented by a token having a smaller integer value than less commonly occurring text. Tokens frequently correspond to words, with or without whitespace appended. In some examples, a token may correspond to a portion of a word. For example, the word "lower" may be represented by a token for [low] and a second token for [er]. In another example, the text sequence "Come here, look!" may be parsed into the segments [Come], [here], [,], [look] and [!], each of which may be represented by a respective numerical token. In addition to tokens that are parsed from the textual sequence (e.g., tokens that correspond to words and punctuation), there may also be special tokens to encode non-textual information. For example, a [CLASS] token may be a special token that corresponds to a classification of the textual sequence (e.g., may classify the textual sequence as a poem, a list, a paragraph, etc.), a [EOT] token may be another special token that indicates the end of the textual sequence, other tokens may provide formatting information, etc.

In FIG. 1B, a short sequence of tokens 56 corresponding to the text sequence "Come here, look!" is illustrated as input to the transformer 50. Tokenization of the text sequence into the tokens 56 may be performed by some pre-processing tokenization module such as, for example, a byte pair encoding tokenizer (the "pre" referring to the tokenization occurring prior to the processing of the tokenized input by the LLM), which is not shown in FIG. 1B for simplicity. In general, the token sequence that is inputted to the transformer 50 may be of any length up to a maximum length defined based on the dimensions of the transformer 50 (e.g., such a limit may be 2048 tokens in some LLMs). Each token 56 in the token sequence is converted into an embedding vector 60 (also referred to simply as an embedding). An embedding 60 is a learned numerical representation (such as, for example, a vector) of a token that captures some semantic meaning of the text segment represented by the token 56. The embedding 60 represents the text segment corresponding to the token 56 in a way such that embeddings corresponding to semantically-related text are closer to each other in a vector space than embeddings corresponding to semantically-unrelated text. For example, assuming that the words "look", "see", and "cake" each correspond to, respectively, a "look" token, a "see" token, and a "cake" token when tokenized, the embedding 60 corresponding to the "look" token will be closer to another embedding corresponding to the "see" token in the vector space, as compared to the distance between the embedding 60 corresponding to the "look" token and another embedding corresponding to the "cake" token. The vector space may be defined by the dimensions and values of the embedding vectors. Various techniques may be used to convert a token 56 to an embedding 60. For example, another trained ML model may be used to convert the token 56 into an embedding 60. In particular, another trained ML model may be used to convert the token 56 into an embedding 60 in a way that encodes additional information into the embedding 60 (e.g., a trained ML model may encode positional information about the position of the token 56 in the text sequence into the embedding 60). In some examples, the numerical value of the token 56 may be used to look up the corresponding embedding in an embedding matrix 58 (which may be learned during training of the transformer 50).

The generated embeddings 60 are input into the encoder 52. The encoder 52 serves to encode the embeddings 60 into feature vectors 62 that represent the latent features of the embeddings 60. The encoder 52 may encode positional information (i.e., information about the sequence of the input) in the feature vectors 62. The feature vectors 62 may have very high dimensionality (e.g., on the order of thousands or tens of thousands), with each element in a feature vector 62 corresponding to a respective feature. The numerical weight of each element in a feature vector 62 represents the importance of the corresponding feature. The space of all possible feature vectors 62 that can be generated by the encoder 52 may be referred to as the latent space or feature space.

Conceptually, the decoder 54 is designed to map the features represented by the feature vectors 62 into meaningful output, which may depend on the task that was assigned to the transformer 50. For example, if the transformer 50 is used for a translation task, the decoder 54 may map the feature vectors 62 into text output in a target language different from the language of the original tokens 56. Generally, in a generative language model, the decoder 54 serves to decode the feature vectors 62 into a sequence of tokens. The decoder 54 may generate output tokens 64 one by one. Each output token 64 may be fed back as input to the decoder 54 in order to generate the next output token 64. By feeding back the generated output and applying self-attention, the decoder 54 is able to generate a sequence of output tokens 64 that has sequential meaning (e.g., the resulting output text sequence is understandable as a sentence and obeys grammatical rules). The decoder 54 may generate output tokens 64 until a special [EOT] token (indicating the end of the text) is generated. The resulting sequence of output tokens 64 may then be converted to a text sequence in post-processing. For example, each output token 64 may be an integer number that corresponds to a vocabulary index. By looking up the text segment using the vocabulary index, the text segment corresponding to each output token 64 can be retrieved, the text segments can be concatenated together and the final output text sequence (in this example, "Viens ici, regarde!") can be obtained.

Although a general transformer architecture for a language model and its theory of operation have been described above, this is not intended to be limiting. Existing language models include language models that are based only on the encoder of the transformer or only on the decoder of the transformer. An encoder-only language model encodes the input text sequence into feature vectors that can then be further processed by a task-specific layer (e.g., a classification layer). BERT is an example of a language model that may be considered to be an encoder-only language model. A decoder-only language model accepts embeddings as input and may use auto-regression to generate an output text sequence. Transformer-XL and GPT-type models may be language models that are considered to be decoder-only language models.

Because GPT-type language models tend to have a large number of parameters, these language models may be considered LLMs. An example GPT-type LLM is GPT-3. GPT-3 is a type of GPT language model that has been trained (in an unsupervised manner) on a large corpus derived from documents available to the public online. GPT-3 has a very large number of learned parameters (on the order of hundreds of billions), is able to accept a large number of tokens as input (e.g., up to 2048 input tokens), and is able to generate a large number of tokens as output (e.g., up to 2048 tokens). GPT-3 has been trained as a generative model, meaning that it can process input text sequences to predictively generate a meaningful output text sequence. ChatGPT is built on top of a GPT-type LLM, and has been fine-tuned with training datasets based on text-based chats (e.g., chatbot conversations). ChatGPT is designed for processing natural language, receiving chat-like inputs and generating chat-like outputs.

A computing system may access a remote language model (e.g., a cloud-based language model), such as ChatGPT or GPT-3, via a software interface (e.g., an application programming interface (API)). Additionally or alternatively, such a remote language model may be accessed via a network such as, for example, the Internet. In some implementations such as, for example, potentially in the case of a cloud-based language model, a remote language model may be hosted by a computer system as may include a plurality of cooperating (e.g., cooperating via a network) computer systems such as may be in, for example, a distributed arrangement. Notably, a remote language model may employ a plurality of processors (e.g., hardware processors such as, for example, processors of cooperating computer systems). Indeed, processing of inputs by an LLM may be computationally expensive/may involve a large number of operations (e.g., many instructions may be executed/large data structures may be accessed from memory) and providing output in a required timeframe (e.g., real-time or near real-time) may require the use of a plurality of processors/cooperating computing devices as discussed above.

Inputs to an LLM may be referred to as a prompt, which is a natural language input that includes instructions to the LLM to generate a desired output. A computing system may generate a prompt that is provided as input to the LLM via its API. As described above, the prompt may optionally be processed or pre-processed into a token sequence prior to being provided as input to the LLM via its API. A prompt can include one or more examples of the desired output, which provides the LLM with additional information to enable the LLM to better generate output according to the desired output. Additionally or alternatively, the examples included in a prompt may provide inputs (e.g., example inputs) corresponding to/as may be expected to result in the desired outputs provided. A one-shot prompt refers to a prompt that includes one example, and a few-shot prompt refers to a prompt that includes multiple examples. A prompt that includes no examples may be referred to as a zero-shot prompt.

Figure 2:
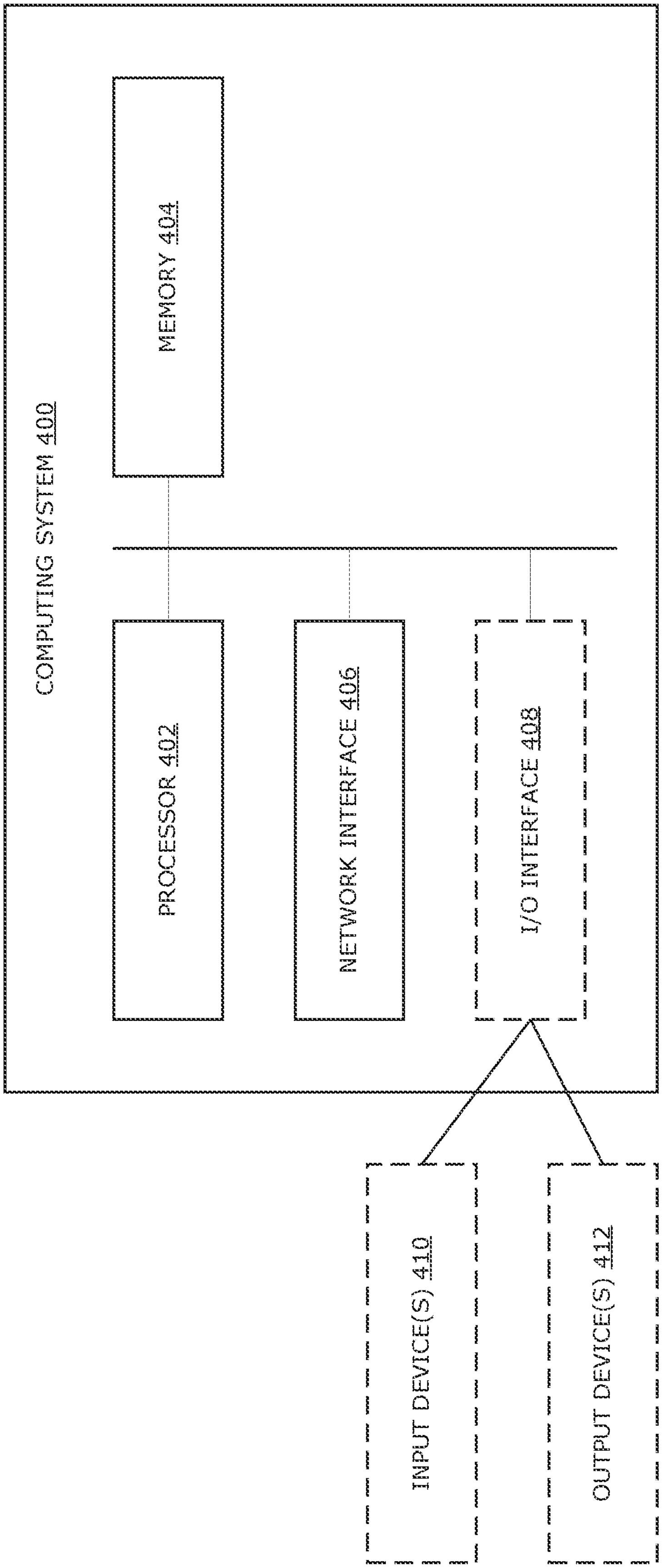
FIG. 2 is a block diagram of an example computing system, which may be used to implement examples of the present disclosure.

FIG. 2 illustrates an example computing system 400, which may be used to implement examples of the present disclosure, such as a prompt generation engine to generate prompts to be provided as input to a language model such as a LLM. Additionally or alternatively, one or more instances of the example computing system 400 may be employed to execute the LLM. For example, a plurality of instances of the example computing system 400 may cooperate to provide output using an LLM in manners as discussed above.

The example computing system 400 includes at least one processing unit, such as a processor 402, and at least one physical memory 404. The processor 402 may be, for example, a central processing unit, a microprocessor, a digital signal processor, an application-specific integrated circuit (ASIC), a field-programmable gate array (FPGA), a dedicated logic circuitry, a dedicated artificial intelligence processor unit, a graphics processing unit (GPU), a tensor processing unit (TPU), a neural processing unit (NPU), a hardware accelerator, or combinations thereof. The memory 404 may include a volatile or non-volatile memory (e.g., a flash memory, a random access memory (RAM), and/or a read-only memory (ROM)). The memory 404 may store instructions for execution by the processor 402, to the computing system 400 to carry out examples of the methods, functionalities, systems and modules disclosed herein.

The computing system 400 may also include at least one network interface 406 for wired and/or wireless communications with an external system and/or network (e.g., an intranet, the Internet, a P2P network, a WAN and/or a LAN). A network interface may enable the computing system 400 to carry out communications (e.g., wireless communications) with systems external to the computing system 400, such as a language model residing on a remote system.

The computing system 400 may optionally include at least one input/output (I/O) interface 408, which may interface with optional input device(s) 410 and/or optional output device(s) 412. Input device(s) 410 may include, for example, buttons, a microphone, a touchscreen, a keyboard, etc. Output device(s) 412 may include, for example, a display, a speaker, etc. In this example, optional input device(s) 410 and optional output device(s) 412 are shown external to the computing system 400. In other examples, one or more of the input device(s) 410 and/or output device(s) 412 may be an internal component of the computing system 400.

A computing system, such as the computing system 400 of FIG. 2, may access a remote system (e.g., a cloud-based system) to communicate with a remote language model or LLM hosted on the remote system such as, for example, using an application programming interface (API) call. The API call may include an API key to enable the computing system to be identified by the remote system. The API call may also include an identification of the language model or LLM to be accessed and/or parameters for adjusting outputs generated by the language model or LLM, such as, for example, one or more of a temperature parameter (which may control the amount of randomness or "creativity" of the generated output) (and/or, more generally some form of random seed as serves to introduce variability or variety into the output of the LLM), a minimum length of the output (e.g., a minimum of 10 tokens) and/or a maximum length of the output (e.g., a maximum of 1000 tokens), a frequency penalty parameter (e.g., a parameter which may lower the likelihood of subsequently outputting a word based on the number of times that word has already been output), a "best of" parameter (e.g., a parameter to control the number of times the model will use to generate output after being instructed to, e.g., produce several outputs based on slightly varied inputs). The prompt generated by the computing system is provided to the language model or LLM and the output (e.g., token sequence) generated by the language model or LLM is communicated back to the computing system. In other examples, the prompt may be provided directly to the language model or LLM without requiring an API call. For example, the prompt could be sent to a remote LLM via a network such as, for example, as or in message (e.g., in a payload of a message).

Language models and LLMs output text in a continuous stream. User Experience (UX) is enhanced by displaying this stream on the display as early as possible. However, the continuous stream might contain a markup instruction that is not intended to be displayed. A markup language is a system having a set of symbols inserted in text to control the structure and/or formatting of the text.

For instance, a markup instruction or markup sequence can add emphasis by making text bold (e.g., to bold text, add two asterisks or underscores before and after a word or phrase) or italic (e.g., to italicize text, add one asterisk or underscore before and after a word or phrase). A markup instruction can be used to format text as a blockquote (e.g., to create a blockquote, add a > in front of a paragraph) or various types of paragraph separation and line separation. A markup instruction can be used to organize items into ordered lists (e.g., to create an ordered list, add line items with numbers followed by periods) and unordered lists (e.g., to create an unordered list, add dashes (-), asterisks (*), or plus signs (+) in front of line items). Other markup instructions can import images (e.g., to import an image, add an exclamation mark (!) and encapsulate the path to the image in parentheses ( )) or create a link to other resources such as a hyperlink.

A markup instruction or markup sequence could be just one character or more than one character. Some markup instructions include a beginning markup sequence to indicate that the markup instruction is beginning. These markup instructions also include a further markup sequence that indicates that the markup instruction is finished. For instance, the markup instruction to make particular text bold might include a beginning and an ending markup sequence where all text between those two markup sequences is intended to be displayed in bold. In some embodiments, the output of a LLM is tokens and those could be the symbols or the symbols could be characters corresponding to the tokens.

Markup is often used to control the display of the document or to enrich its content to facilitate automated processing. For example, when interacting with a chatbot powered by a language model such as a LLM, there is a preference from users to receive timely feedback. As a result, streaming symbols (e.g., words) as they are generated by the language model is a common User Interface (UI) paradigm. However, streaming poses a challenge to rendering markup instructions such as those from the Markdown markup language. Markdown is a lightweight markup language that can be used to add formatting elements to plaintext symbols. While the current disclosure uses Markdown for the examples (such as those above), the embodiments disclosed herein are not limited thereto. For instance, the markup instruction could be from a markup language such as: HyperText Markup Language (HTML); Extensible Markup Language (XML); and Chat Markup Language (ChatML).

The continuous stream of symbols from the language model might include markup instructions. The character sequences for certain Markdown expressions remain ambiguous until a sequence marking the end of the expression is encountered. There are several ways to deal with this continuous stream of symbols. A first solution is to buffer the entire stream before display. This avoids showing the markup instruction, but decreases the UX by delaying the output. A second solution is to display the beginning of the markup instruction. When the end of the markup instruction is reached, the text is formatted according to the markup instruction. This results in faster output of the text, but this decreases the UX by "snapping back" and the appearance of malfunctioning when the markup instruction is replaced with the correct text.

Figure 3:
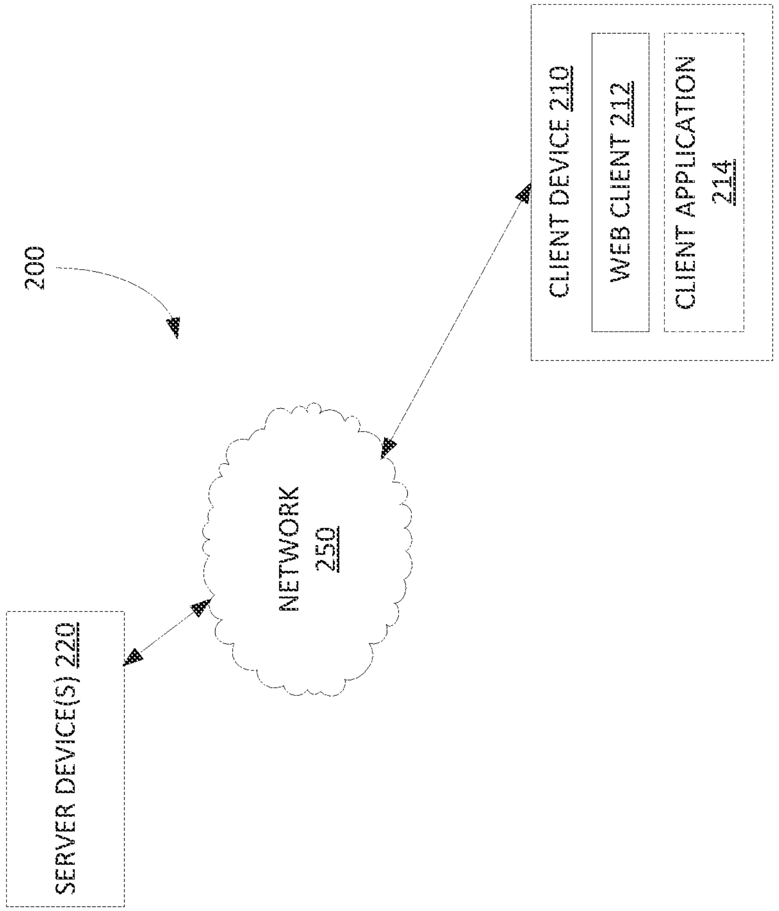
FIG. 3 illustrates an example system for processing requests to access server data.

FIG. 3 illustrates an example system for processing requests to access server data. FIG. 3 illustrates, in block diagram form, an example system 200 for processing requests to access server data. As shown in FIG. 3, the system 200 may include a client device 210, one or more server devices 220, and a network 250 connecting one or more of the components of system 200.

As illustrated, the client device 210 and the server device 220 can communicate via the network 250. In at least some embodiments, the client device 210 may be a computing device. The client device 210 may take a variety of forms including, for example, a mobile communication device such as a smartphone, a tablet computer, a wearable computer (such as a head-mounted display or smartwatch), a laptop or desktop computer, or a computing device of another type. The client device 210 includes, at least, a web client 212 (e.g., a web browser application) and perhaps a client application 214. The client application 214 may be, for example, a dedicated retail application associated with an e-commerce platform and/or a merchant. In particular, the client application 214 may be used for accessing an e-commerce platform and/or a merchant's online store on the client device 210.

The server device 220 represents a computing system associated with a specific server such as one that can serve a web site. In some embodiments, the server device 220 may be a backend server associated with a merchant's online store. For example, the server device 220 may be an application server associated with an online point-of-sale (e.g., website, mobile application, etc.) that is operated by a merchant. The online point-of-sale may be accessed by a customer via a user interface, provided by the application server, on the client device 210. Additionally, or alternatively, the server device 220 may be integrated with an e-commerce platform. In particular, the server device 220 may be associated with one or more storefronts of a merchant that are supported by an e-commerce platform. A merchant's online e-commerce service offerings may be provided via the server device 220.

The network 250 is a computer network. In some embodiments, the network 250 may be an internetwork such as may be formed of one or more interconnected computer networks. For example, the network 250 may be or may include an Ethernet network, an asynchronous transfer mode (ATM) network, a wireless network, or the like.

Figure 4:
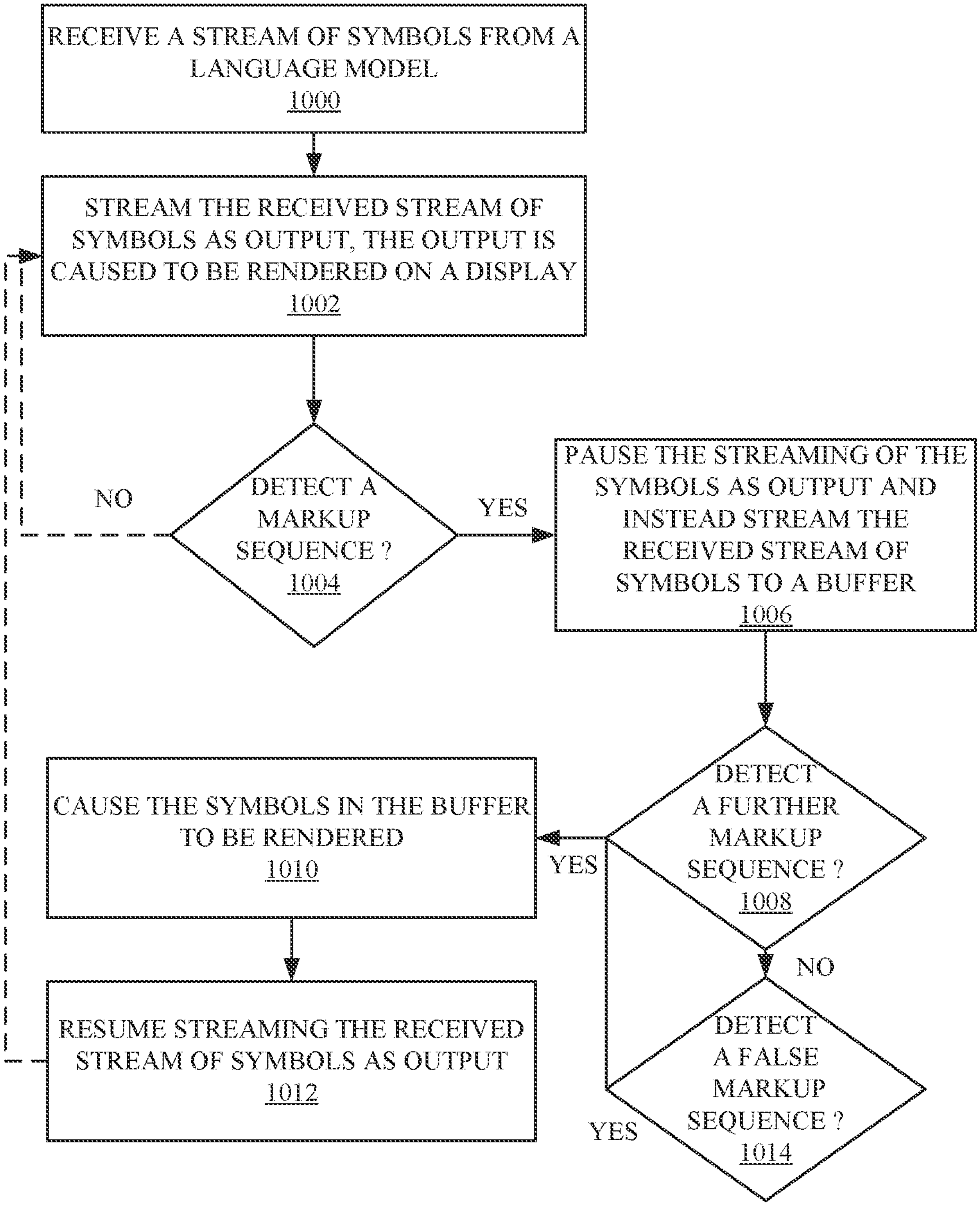
FIG. 4 is a flowchart that illustrates a computer-implemented process for detecting and selectively buffering markup instruction candidates in a streamed language model output, in accordance with an embodiment of the present disclosure.

Systems and methods for detecting and selectively buffering markup instruction candidates in a streamed language model output are provided. FIG. 4 is a flowchart that illustrates a computer-implemented process for detecting and selectively buffering markup instruction candidates in a streamed language model output, in accordance with an embodiment of the present disclosure. The procedure of FIG. 4 may be implemented by a server computer, implemented by multiple server computers that operate together to provide the described functionality, or implemented as one or more virtual machines or the like that execute on any suitable hardware platform.

In some embodiments, the computer-implemented process is performed in the system 200 in a client-server relationship between client device 210 and server device 220. In some embodiments, the relationship is a web browser or web client 212 in the client device 210 and the server device 220 is serving a webpage. As described above, the server device 220 could be more than one cooperating server. In some embodiments, one or both of the client device 210 and server device 220 could be the example computing system 400 described in relation to FIG. 2 or some other suitable computing device. In some embodiments, the processor 402 of the computing system 400 executes instructions from the attached memory 404.

Reference is not made to FIG. 4, which shows, in flowchart form, a computer-implemented method for detecting and selectively buffering markup instruction candidates in a streamed language model output are provided. The computer-implemented method may be performed at the client device 210, at the server device 220, or at two or more such nodes cooperating. In some embodiments, even if the server device 220 is performing steps of the computer-implemented method, the display will be at the client device 210. In this situation, the data to be displayed could be sent through the network 250 to the client device 210 to be displayed on an output device 412.

In operation 1000, the computer-implemented method receives a stream of symbols from a language model. In some embodiments, this stream is the output (e.g., token sequence) generated by a language model or LLM as discussed above.

In operation 1002, the computer-implemented method streams the received stream of symbols as output. The output is caused to be rendered on a display. According to some embodiments of the current disclosure, if no markup instruction is detected, the stream is passed through to the display. This decreases the delay in displaying the output of the language model. The continuous stream of symbols from the language model might include markup instructions.

In operation 1004, the computer-implemented method detects a markup sequence in the received stream of symbols. In some embodiments, this is accomplished in a streaming fashion where a sequence of characters or a particular character is received that is identified by a parser as a markup sequence. For example, for a Markdown instruction to make text bold, two asterisks appear before and after a word or phrase. The character sequences for certain Markdown expressions remain ambiguous until a sequence marking the end of the expression is encountered. For instance, the Markdown instruction to create an unordered list adds asterisks (*) in front of line items. The computer-implemented method might need to wait for the end of the markup sequence.

In operation 1006, the computer-implemented method, in response to detecting the markup sequence, pauses the streaming of the symbols as output and instead streams the received stream of symbols to a buffer. In some embodiments, the buffer starts empty and then accrues symbols from the stream. This buffering can prevent the "snapping back" and the appearance of malfunctioning when the markup instruction is replaced with the correct text as discussed herein.

In operation 1008, the computer-implemented method detects a further markup sequence in the received stream of symbols. This further markup sequence marks the end of the markup instruction. For instance, the further markup sequence might be the final two asterisks that enclose the text that should be bolded. In other instances, the computer-implemented method may detect an end to the line indicating that the line was an ordered list.

In operation 1010, the computer-implemented method, responsive to detecting the further markup sequence in the received stream of symbols, causes the symbols in the buffer to be rendered and resumes streaming the received stream of symbols as output. For instance, this could mean causing the text to display as bold, italic, etc. depending on the markup instruction detected. After this, the buffer can be emptied.

In operation 1012, the computer-implemented method resumes causing the received stream of symbols to be streamed as output. In some embodiments, the computer-implemented method returns back to operation 1002.

In operation 1014, the computer-implemented method determines that a markup sequence was falsely detected. In this case, the symbols have been added to the buffer unnecessarily. These symbols do not need to be buffered any longer. The computer-implemented method would cause the buffer to be flushed to the display. In some embodiments, the computer-implemented method may get to the end of the stream with symbols still in the buffer. This could happen, for instance, if a markup sequence was falsely detected or if the received stream of symbols was malformed in some way. In such a case, the computer-implemented method would cause the buffer to be flushed to the display. This would include the symbols that were mistakenly detected as a markup sequence.

According to some embodiments of the current disclosure, if no markup instruction is detected, the stream is passed through to the display. This decreases the delay in displaying the output of the language model. If a markup instruction is detected, it is not displayed. Instead, the symbols are buffered until the end of the markup instruction is detected. Then, the properly formatted text is displayed. This avoids the "snapping back" behavior discussed above.

One aspect that makes it difficult to execute a markup instruction before the end of the instruction is received is that character sequences for certain markup instructions remain ambiguous until a sequence marking the end of the expression is encountered. A first example from the Markdown language includes the emphasis (strong) markup instruction versus the markup instruction to create an unordered list item. A "*" character at the beginning of a line could be either. Until either the closing "*" character is encountered (emphasis), or an immediately following whitespace character is encountered (list item start), it remains ambiguous whether this "*" will end up being rendered as a <strong> or a <li> HTML element. Another example is a link. Until the closing parenthesis in a "[link text] (link URL)" is encountered, an <a> HTML element cannot be rendered since the full URL is not yet known.

Figure 5A:
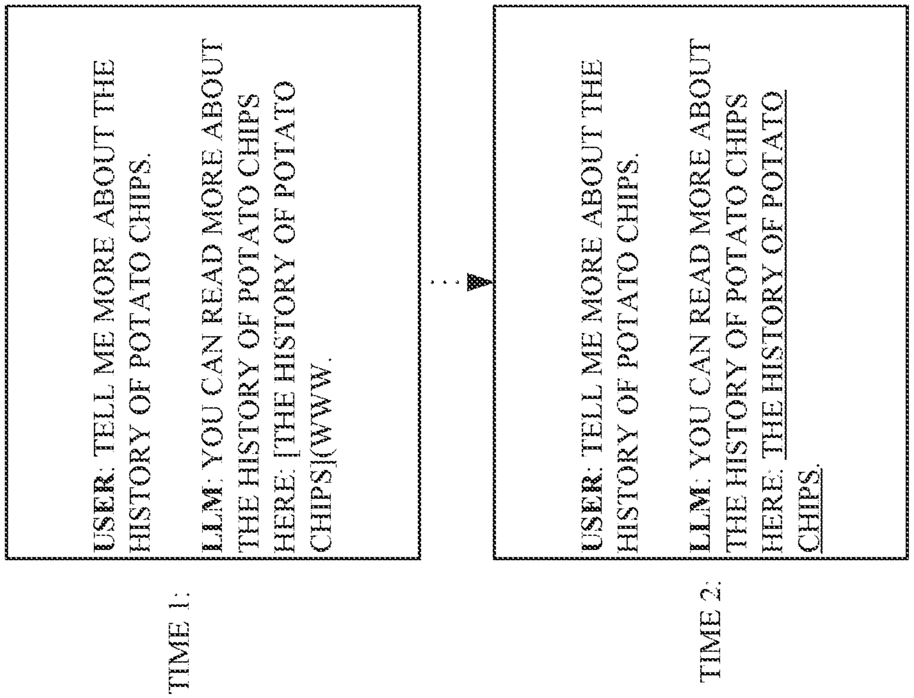
FIGS. 5A and 5B illustrate an example of the different behavior according to some embodiments disclosed herein.
Figure 5B:
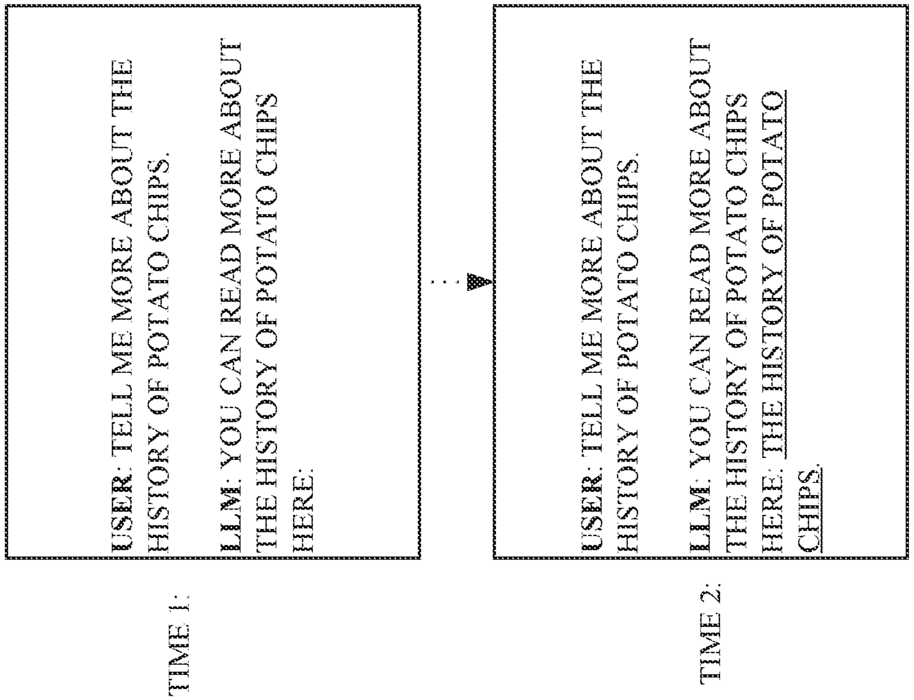

An example of the different behavior according to some embodiments disclosed herein is illustrated in FIGS. 5A and 5B. These figures illustrate what would be displayed to a user at different times. In FIG. 5A, the User asks the LLM "Tell me more about the history of potato chips." The LLM begins responding to the query by streaming the output to the display. In this case, the output includes a hyperlink. However, until the closing parenthesis in a "[link text] (link URL)" is encountered, an <a> HTML element cannot be rendered since the full URL is not yet known. Finally, at Time 2 illustrated in FIG. 5A, the end of the Markdown sequence is reached. The text that had been displayed as part of the Markdown expression is now replaced by the hyperlinked text. This snapping back gives the user the appearance of malfunctioning when the markup instruction is replaced with the correct text.

In contrast, FIG. 5B illustrates the same interaction as in FIG. 5A but with the addition of the computer-implemented method described in FIG. 3. At Time 1, a stream of symbols is received (step 1000) from a language model and streamed (step 1002) as output. The output is caused to be rendered on a display. The streaming of the symbols as output includes detecting (step 1004) a markup sequence in the received stream of symbols. In this example, the symbol for the opening parenthesis "(" is detected as the potential beginning of a markup sequence. In response to detecting the markup sequence, the method pauses (step 1006) the streaming of the symbols as output and instead streams the received stream of symbols to a buffer. Eventually, the final parenthesis of the markup sequence is received in the stream. In response to/responsive to detecting (step 1008) the further markup sequence in the received stream of symbols, the method causes (step 1010) the symbols in the buffer to be rendered and resumes streaming the received stream of symbols as output. This is shown at Time 2 illustrated in FIG. 5B. In this case, the stream of symbols is displayed as soon as possible to avoid delay. However, since the markup instruction candidates are detected and selectively buffered, the UX is improved.

In some embodiments, the method disclosed herein is implemented through the use of a stateful stream processor coupled with a buffer. The output stream of the LLM is parsed by the stream processor which updates the buffer state (e.g., store or flush) based on whether the sequence in the output stream currently being parsed is a candidate for a markup instruction. In some embodiments, the stateful stream processor that can consume characters one-by-one. The stream processor either passes through the characters as they come in, or it updates the buffer as it encounters Markdown-like character sequences.

In some embodiments, the stream processor is implemented using a Node.js Transform stream (or similar functionality) to perform this stateful processing. Node.js is an open-source, cross-platform JavaScript runtime environment. Node.js is a back-end JavaScript runtime environment that executes JavaScript code outside of the web browser. Node.js transform streams are streams which read input, process the data, and then output new data. The transform stream runs a Finite State Machine (FSM), fed by individual characters of stream chunks that are piped into it. In some embodiments, these stream chunks are characters, not bytes. For most LLMs, the chunks streamed from the LLM will be split at Unicode character boundaries. This can make the processing simpler. For instance, to iterate over the Unicode characters in a stream chunk, an iterator (e.g., for . . . of over a chunk string) can be used. In some embodiments, the stream processor employs an off-the-shelf parser generator that supports push lexing/parsing. However, since Markdown is not a regular language or even a deterministic context free grammar, this could be difficult. In some embodiments, additional changes to the language model can be made to enhance this procedure. For instance, if only a limited set of markup instructions are supported, this can simplify the logic and avoid ambiguous markup instructions.

In some embodiments, the computer-implemented method described herein is used to process Markdown instructions from a LLM such as Sidekick. Sidekick is an LLM included in the Shopify environment to be a virtual assistant. A user can ask Sidekick questions and get help with the user's to-do list. By incorporating the computer-implemented method described herein into Sidekick, the UX can be increased by not delaying the output and avoiding the appearance of malfunctioning when the markup instruction is replaced with the correct text.

In some embodiments, especially where it is ambiguous which markup instruction is intended (if any), the stream processor might believe that a markup instruction was started, but it was not really started. In this case, the stream processor needs to stop buffering the stream when the stream processor is confident that a markup instruction was not intended. For instance, this could happen if the stream processor encounters a character that would be unexpected based on the assumed markup instruction.

Implementations

The methods and systems described herein may be deployed in part or in whole through a machine that executes computer software, program codes, and/or instructions on a processor. The processor may be part of a server, cloud server, client, network infrastructure, mobile computing platform, stationary computing platform, or other computing platform. A processor may be any kind of computational or processing device capable of executing program instructions, codes, binary instructions and the like. The processor may be or include a signal processor, digital processor, embedded processor, microprocessor or any variant such as a co-processor (math co-processor, graphic co-processor, communication co-processor and the like) and the like that may directly or indirectly facilitate execution of program code or program instructions stored thereon. In addition, the processor may enable execution of multiple programs, threads, and codes. The threads may be executed simultaneously to enhance the performance of the processor and to facilitate simultaneous operations of the application. By way of implementation, methods, program codes, program instructions and the like described herein may be implemented in one or more threads. The thread may spawn other threads that may have assigned priorities associated with them; the processor may execute these threads based on priority or any other order based on instructions provided in the program code. The processor may include memory that stores methods, codes, instructions and programs as described herein and elsewhere. The processor may access a storage medium through an interface that may store methods, codes, and instructions as described herein and elsewhere. The storage medium associated with the processor for storing methods, programs, codes, program instructions or other type of instructions capable of being executed by the computing or processing device may include but may not be limited to one or more of a CD-ROM, DVD, memory, hard disk, flash drive, RAM, ROM, cache and the like.

A processor may include one or more cores that may enhance speed and performance of a multiprocessor. In some embodiments, the process may be a dual core processor, quad core processors, other chip-level multiprocessor and the like that combine two or more independent cores (called a die).

The methods and systems described herein may be deployed in part or in whole through a machine that executes computer software on a server, cloud server, client, firewall, gateway, hub, router, or other such computer and/or networking hardware. The software program may be associated with a server that may include a file server, print server, domain server, internet server, intranet server and other variants such as secondary server, host server, distributed server and the like. The server may include one or more of memories, processors, computer readable media, storage media, ports (physical and virtual), communication devices, and interfaces capable of accessing other servers, clients, machines, and devices through a wired or a wireless medium, and the like. The methods, programs or codes as described herein and elsewhere may be executed by the server. In addition, other devices required for execution of methods as described in this application may be considered as a part of the infrastructure associated with the server.

The server may provide an interface to other devices including, without limitation, clients, other servers, printers, database servers, print servers, file servers, communication servers, distributed servers and the like. Additionally, this coupling and/or connection may facilitate remote execution of programs across the network. The networking of some or all of these devices may facilitate parallel processing of a program or method at one or more locations without deviating from the scope of the disclosure. In addition, any of the devices attached to the server through an interface may include at least one storage medium capable of storing methods, programs, code and/or instructions. A central repository may provide program instructions to be executed on different devices. In this implementation, the remote repository may act as a storage medium for program code, instructions, and programs.

The software program may be associated with a client that may include a file client, print client, domain client, internet client, intranet client and other variants such as secondary client, host client, distributed client and the like. The client may include one or more of memories, processors, computer readable media, storage media, ports (physical and virtual), communication devices, and interfaces capable of accessing other clients, servers, machines, and devices through a wired or a wireless medium, and the like. The methods, programs or codes as described herein and elsewhere may be executed by the client. In addition, other devices required for execution of methods as described in this application may be considered as a part of the infrastructure associated with the client.

The client may provide an interface to other devices including, without limitation, servers, other clients, printers, database servers, print servers, file servers, communication servers, distributed servers and the like. Additionally, this coupling and/or connection may facilitate remote execution of programs across the network. The networking of some or all of these devices may facilitate parallel processing of a program or method at one or more locations without deviating from the scope of the disclosure. In addition, any of the devices attached to the client through an interface may include at least one storage medium capable of storing methods, programs, applications, code and/or instructions. A central repository may provide program instructions to be executed on different devices. In this implementation, the remote repository may act as a storage medium for program code, instructions, and programs.

The methods and systems described herein may be deployed in part or in whole through network infrastructures. The network infrastructure may include elements such as computing devices, servers, routers, hubs, firewalls, clients, personal computers, communication devices, routing devices and other active and passive devices, modules and/or components as known in the art. The computing and/or non-computing device(s) associated with the network infrastructure may include, apart from other components, a storage medium such as flash memory, buffer, stack, RAM, ROM and the like. The processes, methods, program codes, instructions described herein and elsewhere may be executed by one or more of the network infrastructural elements.

The methods, program codes, and instructions described herein and elsewhere may be implemented in different devices which may operate in wired or wireless networks. Examples of wireless networks include 4th Generation (4G) networks (e.g., Long-Term Evolution (LTE)) or 5th Generation (5G) networks, as well as non-cellular networks such as Wireless Local Area Networks (WLANs). However, the principles described therein may equally apply to other types of networks.

The operations, methods, programs codes, and instructions described herein and elsewhere may be implemented on or through mobile devices. The mobile devices may include navigation devices, cell phones, mobile phones, mobile personal digital assistants, laptops, palmtops, netbooks, pagers, electronic books readers, music players and the like. These devices may include, apart from other components, a storage medium such as a flash memory, buffer, RAM, ROM and one or more computing devices. The computing devices associated with mobile devices may be enabled to execute program codes, methods, and instructions stored thereon. Alternatively, the mobile devices may be configured to execute instructions in collaboration with other devices. The mobile devices may communicate with base stations interfaced with servers and configured to execute program codes. The mobile devices may communicate on a peer-to-peer network, mesh network, or other communications network. The program code may be stored on the storage medium associated with the server and executed by a computing device embedded within the server. The base station may include a computing device and a storage medium. The storage device may store program codes and instructions executed by the computing devices associated with the base station.

The computer software, program codes, and/or instructions may be stored and/or accessed on machine readable media that may include: computer components, devices, and recording media that retain digital data used for computing for some interval of time; semiconductor storage known as random access memory (RAM); mass storage typically for more permanent storage, such as optical discs, forms of magnetic storage like hard disks, tapes, drums, cards and other types; processor registers, cache memory, volatile memory, non-volatile memory; optical storage such as CD, DVD; removable media such as flash memory (e.g., USB sticks or keys), floppy disks, magnetic tape, paper tape, punch cards, standalone RAM disks, Zip drives, removable mass storage, off-line, and the like; other computer memory such as dynamic memory, static memory, read/write storage, mutable storage, read only, random access, sequential access, location addressable, file addressable, content addressable, network attached storage, storage area network, bar codes, magnetic ink, and the like.

The methods and systems described herein may transform physical and/or or intangible items from one state to another. The methods and systems described herein may also transform data representing physical and/or intangible items from one state to another, such as from usage data to a normalized usage dataset.

The elements described and depicted herein, including in flow charts and block diagrams throughout the figures, imply logical boundaries between the elements. However, according to software or hardware engineering practices, the depicted elements and the functions thereof may be implemented on machines through computer executable media having a processor capable of executing program instructions stored thereon as a monolithic software structure, as standalone software modules, or as modules that employ external routines, code, services, and so forth, or any combination of these, and all such implementations may be within the scope of the present disclosure. Examples of such machines may include, but may not be limited to, personal digital assistants, laptops, personal computers, mobile phones, other handheld computing devices, medical equipment, wired or wireless communication devices, transducers, chips, calculators, satellites, tablet PCs, electronic books, gadgets, electronic devices, devices having artificial intelligence, computing devices, networking equipment, servers, routers and the like. Furthermore, the elements depicted in the flow chart and block diagrams or any other logical component may be implemented on a machine capable of executing program instructions. Thus, while the foregoing drawings and descriptions set forth functional aspects of the disclosed systems, no particular arrangement of software for implementing these functional aspects should be inferred from these descriptions unless explicitly stated or otherwise clear from the context. Similarly, it will be appreciated that the various steps identified and described above may be varied, and that the order of steps may be adapted to particular applications of the techniques disclosed herein. All such variations and modifications are intended to fall within the scope of this disclosure. As such, the depiction and/or description of an order for various steps should not be understood to require a particular order of execution for those steps, unless required by a particular application, or explicitly stated or otherwise clear from the context.

The methods and/or processes described above, and steps thereof, may be realized in hardware, software or any combination of hardware and software suitable for a particular application. The hardware may include a general-purpose computer and/or dedicated computing device or specific computing device or particular aspect or component of a specific computing device. The processes may be realized in one or more microprocessors, microcontrollers, embedded microcontrollers, programmable digital signal processors or other programmable devices, along with internal and/or external memory. The processes may also, or instead, be embodied in an application specific integrated circuit, a programmable gate array, programmable array logic, or any other device or combination of devices that may be configured to process electronic signals. It will further be appreciated that one or more of the processes may be realized as a computer executable code capable of being executed on a machine-readable medium.

The computer executable code may be created using a structured programming language such as C, an object oriented programming language such as C++, or any other high-level or low-level programming language (including assembly languages, hardware description languages, and database programming languages and technologies) that may be stored, compiled or interpreted to run on one of the above devices, as well as heterogeneous combinations of processors, processor architectures, or combinations of different hardware and software, or any other machine capable of executing program instructions.

Thus, in one aspect, each method described above, and combinations thereof may be embodied in computer executable code that, when executing on one or more computing devices, performs the steps thereof. In another aspect, the methods may be embodied in systems that perform the steps thereof and may be distributed across devices in a number of ways, or all of the functionality may be integrated into a dedicated, standalone device or other hardware. In another aspect, the means for performing the steps associated with the processes described above may include any of the hardware and/or software described above. All such permutations and combinations are intended to fall within the scope of the present disclosure.

The invention claimed is:

1. A computer-implemented method comprising:
receiving a stream of symbols from a language model; and
streaming the received stream of symbols as output, the output is caused to be rendered on a display, the streaming of the symbols as output comprises:
detecting a markup sequence in the received stream of symbols;
responsive to detecting the markup sequence, pausing the streaming of the symbols as output and instead streaming the received stream of symbols to a buffer;
detecting a further markup sequence in the received stream of symbols; and
responsive to detecting the further markup sequence in the received stream of symbols:
causing the symbols in the buffer to be rendered; and
resuming streaming the received stream of symbols as output.

2. The computer-implemented method of claim 1, wherein the markup sequence and the further markup sequence denote a markup instruction.

3. The computer-implemented method of claim 2, wherein, responsive to the denoted markup instruction, the symbols in the buffer are caused to be rendered based on the markup instruction.

4. The computer-implemented method of claim 1 wherein the markup sequence and the further markup sequence denote a false detection of a markup instruction.

5. The computer-implemented method of claim 4 wherein, responsive to the false detection of the markup instruction, the symbols in the buffer are caused to be rendered without the markup instruction.

6. The computer-implemented method of claim 1 wherein the Language Model is a Large Language Model.

7. The computer-implemented method of claim 2 wherein the markup instruction is from a Markdown markup language.

8. The computer-implemented method of claim 2 wherein the markup instruction is from a markup language comprising one of the group consisting of: HTML; XML; and Chat Markup Language.

9. The computer-implemented method of claim 1 further comprising:
before detecting the further markup sequence, causing to be rendered on a display that buffering is occurring.

10. The computer-implemented method of claim 1 wherein receiving the stream and streaming the received stream of symbols are implemented through use of a stateful stream processor coupled with the buffer.

11. The computer-implemented method of claim 10 wherein the received stream of symbols is parsed by the stateful stream processor which updates the buffer based on whether the markup sequence in the received stream of symbols currently being parsed is a candidate for a markup instruction.

12. A computing system comprising:
processing circuitry; and
memory comprising instructions executed by the processing circuitry whereby the computing system is operable to:
receive a stream of symbols from a language model; and
stream the received stream of symbols as output, the output is caused to be rendered on a display, the streaming of the symbols as output comprises being operable to:
detect a markup sequence in the received stream of symbols;
responsive to detecting the markup sequence, pause the streaming of the symbols as output and instead stream the received stream of symbols to a buffer;
detect a further markup sequence in the received stream of symbols; and
responsive to detecting the further markup sequence in the received stream of symbols:
cause the symbols in the buffer to be rendered; and
resume streaming the received stream of symbols as output.

13. The computing system of claim 12, wherein the markup sequence and the further markup sequence denote a markup instruction.

14. The computing system of claim 13, wherein, responsive to the denoted markup instruction, the symbols in the buffer are caused to be rendered based on the markup instruction.

15. The computing system of claim 12 wherein the markup sequence and the further markup sequence denote a false detection of a markup instruction.

16. The computing system of claim 15 wherein, responsive to the false detection of the markup instruction, the symbols in the buffer are caused to be rendered without the markup instruction.

17. The computing system of claim 12 wherein the Language Model is a Large Language Model.

18. The computing system of claim 13 wherein the markup instruction is from a Markdown markup language.

19. The computing system of claim 13 wherein the markup instruction is from a markup language comprising one of the group consisting of: HTML; XML; and Chat Markup Language.

20. A non-transitory computer readable medium comprising instructions executable by processing circuitry of a computing system whereby the computing system is operable to:
receive a stream of symbols from a language model; and
stream the received stream of symbols as output, the output is caused to be rendered on a display, the streaming of the symbols as output comprises being operable to:
detect a markup sequence in the received stream of symbols;
responsive to detecting the markup sequence, pause the streaming of the symbols as output and instead stream the received stream of symbols to a buffer;
detect a further markup sequence in the received stream of symbols; and
responsive to detecting the further markup sequence in the received stream of symbols:
cause the symbols in the buffer to be rendered; and
resume streaming the received stream of symbols as output.

21. The computer-implemented method of claim 2, wherein the markup instruction indicated by the markup sequence and the further markup sequence controls a structure or formatting of text in the received stream of symbols between the markup sequence and the further markup sequence.

* * * * *